United States Patent [19]

Brock et al.

[11] Patent Number: 5,519,464
[45] Date of Patent: May 21, 1996

[54] MAGNETICS-ON-FILM IMAGE AREA RECORDING HEAD WITH FILM FLATTENING EMULSION SIDE SUPPORT

[75] Inventors: George W. Brock, La Jolla; Wlodzimierz S. Czarnecki, Rancho Santa Fe; Kent R. Gandola, Carlsbad, all of Calif.

[73] Assignee: Eastman Kodak Company, Rochester, N.Y.

[21] Appl. No.: 346,995

[22] Filed: Nov. 30, 1994

[51] Int. Cl.[6] .............................. G03B 17/24; G11B 5/48
[52] U.S. Cl. .......................... 354/106; 360/1; 360/130.3
[58] Field of Search ................................ 354/105, 106, 354/76; 360/130.3, 1, 3, 104

[56] References Cited

U.S. PATENT DOCUMENTS

| | | | |
|---|---|---|---|
| 3,157,868 | 11/1964 | Buslik | 360/130.31 |
| 3,218,077 | 11/1965 | Morrison et al. | 274/4 |
| 3,648,941 | 3/1972 | Merry | 242/55.19 |
| 3,682,486 | 8/1972 | Zwetzig et al. | 274/4 |
| 4,612,593 | 9/1986 | Oishi | 360/130.31 |
| 4,669,016 | 5/1987 | Schmid et al. | 360/122 |
| 4,910,629 | 3/1990 | Mitsuhashi et al. | 360/121 |
| 4,922,361 | 5/1990 | Bordignon | 360/130.31 |
| 4,933,780 | 6/1990 | Wash et al. | 360/1 |
| 4,977,419 | 12/1990 | Wash et al. | 354/76 |
| 5,006,873 | 4/1991 | Wash | 354/106 |
| 5,025,283 | 6/1991 | Robison | 355/40 |
| 5,034,836 | 7/1991 | DeMarti, Jr. et al. | 360/104 |
| 5,041,933 | 8/1991 | DeMarti, Jr. et al. | 360/104 |
| 5,146,378 | 9/1992 | Makino et al. | 360/121 |
| 5,231,438 | 7/1993 | Smart | 354/281 |
| 5,274,522 | 12/1993 | Taillie | 360/130.3 |
| 5,276,472 | 1/1994 | Bell et al. | 354/76 |
| 5,282,102 | 1/1994 | Christianson | 360/104 |
| 5,285,324 | 2/1994 | Weigand et al. | 360/3 |
| 5,285,325 | 2/1994 | Kiesow | 360/3 |
| 5,307,100 | 4/1994 | Kubo | 354/105 |
| 5,321,452 | 6/1994 | Tsujimoto | 354/106 |
| 5,344,730 | 9/1994 | Kitamoto | 354/106 X |
| 5,450,149 | 9/1995 | Cocca | 354/106 |

*Primary Examiner*—A. A. Mathews
*Attorney, Agent, or Firm*—William F. Noval

[57] ABSTRACT

Magnetic recording and/or reproducing heads particularly for use for recording and reading information on a magnetics-on-film (MOF) layer in the image area of photographic filmstrips exhibiting a cross-film curvature in cameras or other filmstrip handling apparatus. A magnetic record/reproduce multi-head array is formed of a plurality of magnetic head elements mounted to extend across the width of the filmstrip and across the filmstrip image frame area, each head element contacting the magnetic layer at a predetermined cross-film position in a film transport path. The surfaces of the head elements aligned to contact the filmstrip magnetic layer are burnished or lapped by an abrasive tape lapping of the head as a final contouring operation on the head to remove all edges that can scrape or scratch the magnetic surface of the filmstrip. An elongated, compliant backing support, e.g. a free wheeling roller, pad or brush, having a low friction contact surface, is positioned to bear against the filmstrip emulsion layer opposite to the multi-head array. Light pressure is applied through the backing support to conform the filmstrip magnetic layer to the magnetic head elements in the cross-film and film advance directions.

22 Claims, 5 Drawing Sheets

MAGNETICS-ON-FILM IMAGE AREA RECORDING HEAD WITH FILM FLATTENING EMULSION SIDE SUPPORT

CROSS-REFERENCE TO RELATED APPLICATIONS

Reference is hereby made to commonly assigned, co-pending U.S. patent application Ser. Nos.: filed 1994, in the names of W. Stanley Czarnecki et al. and titled MAGNETICS-ON-FILM IMAGE AREA RECORDING HEAD AND INTERFACE; filed 1994, in the names of G. William Brock et al. for MAGNETICS-ON-FILM IMAGE AREA RECORDING HEAD AND SUSPENSION SYSTEM; and filed 1994, in the names of Kent Gandola et al. for MAGNETICS-ON-FILM IMAGE AREA RECORDING HEAD SUSPENSION SYSTEM.

FIELD OF THE INVENTION

This invention relates to magnetic recording and/or reproducing heads particularly for use for recording and reading information on a magnetics-on-film (MOF) layer in the image area of photographic filmstrips and particularly to the configuration and mounting of such recording head elements in relation to a flexible backing plate to achieve high compliance with the relatively stiff filmstrip and MOF layer in cameras or other filmstrip handling apparatus.

BACKGROUND OF THE INVENTION

In commonly assigned U.S. Pat. Nos. 4,933,780, 4,977,419, 5,006,873, 5,025,283, and 5,276,472, a photographic filmstrip having a virtually transparent, magnetic film layer covering the non-emulsion side of the filmstrip (referred to as an MOF layer) is disclosed in conjunction with various camera systems. Potential longitudinal recording tracks are illustrated in the MOF layer in both the image frame area and on either side of the image frame area for recording information such as film type, film speed, film exposure information and information relevant to the processing and subsequent use (e.g., printing) of the exposed image frames. The systems disclosed therein provide for recording of information during film manufacture, reading and/or recording of information on certain tracks during camera use, and reading and/or recording of printer related information during photofinishing. The information recorded during camera use may include voiced messages or sound associated with the photographed scene and may be recorded in digital or analog format on certain of the tracks.

The specific camera recording tracks and recording heads disclosed in the '419 and '780 patents are disposed to record in tracks located along the longitudinal edges of the film and outside the MOF layer in the image frame area. Further commonly assigned U.S. Pat. Nos. 5,034,836, 5,041,933, 5,274,522 and 5,285,324 and U.S. Pat. No. 5,307,100 disclose magnetic recording head configurations for use in recording in longitudinal tracks alongside the filmstrip edges but not in the image frame area.

The above-referenced patents showing magnetic recording heads along the edges of the filmstrip outside the image area generally teach providing pressure pad supports or rollers on the emulsion side opposite from the recording heads and continuous motion of the recording medium to ensure reliable recording. In the above-referenced '100 and '324 patents, various configurations for mounting a magnetic recording head in relation to the film transport path and film plane with the use of an oppositely disposed pressure rollers are disclosed in a camera.

In the above-referenced '780 patent, a different approach is taken wherein the recording head of the camera is positioned with respect to the chamber for receiving a modified film cartridge. The recording head bears against the MOF layer of a filmstrip exposed through an opening in the film cartridge lip. The film is supported and flattened within the lip, and the emulsion bears against a compliant support formed with a light blocking plush material overlying a lower flange of the cartridge lip.

The '780 patent also suggests that an elongated array of recording heads may be positioned to penetrate an elongated opening in the cartridge lip, relying on the plush as a backing support. The approach taken in the '780 patent requires the acceptance of a new film cartridge standard in the industry, and the use of plush material to block light entry through the opening.

None of the above-referenced patents specifically disclose magnetic recording head arrays (i.e., multi-head arrays) or any specific support structures for each magnetic recording head element for recording or reproducing in a plurality of tracks in the MOF layer on the side of the film opposite to the image frame area or support structures. Reading and recording information on tracks of a magnetic coating or stripes of magnetic coatings in the image frame area on photographic film in a still camera require solutions to problems different than those encountered in other magnetic media recording apparatus.

In a disk drive, the recording head flies or floats on the air film that is created as the nominally flat surface of the magnetic disk rotates at high speed on an actuator assembly as shown in U.S. Pat. No. 5,282,102, for example. The disk is not inherently curved or irregular as it rotates, and close recording head compliance can be attained. Pitch and roll of the magnetic recording head to follow minute irregularities in the magnetic disk surface is allowed by the configuration of the mount at the free end of the loading arm of the actuator assembly.

In a tape drive, the magnetic tape is flexible enough under tension to conform to the recording head contour both in the tape feed direction and in the cross-tape direction. Magnetic tape is quite thin and exhibits virtually no stiffness. Recording is done with the magnetic tape moving at a constant speed typically using a capstan roller. Minor scratches of the magnetic tape is not a matter of great concern, as long as the recorded signal or head integrity is not compromised. Magnetic video tapes are typically wrapped around a head drum. Magnetic audio tape is typically pressed against stationary record/reproduce heads by backing rollers or pads of the type disclosed, for example, in U.S. Pat. Nos. 3,648,941, 3,682,486, 4,612,593 and 4,922,361. Typically, the magnetic tape is also wrapped around the magnetic record/reproduce head to some degree.

Photographic film, however, is of much greater thickness than the magnetic tape used for commercial and consumer recording and reproduction and is neither compliant nor inherently flat. When removed from its cartridge, a filmstrip shows a relatively high stiffness and very observable cross-curvature across its width that is convex on the non-emulsion side of the film. Further, the unwrapped filmstrip also shows a convex curvature along its length, again on the non-emulsion side of the film. This latter curvature is attributed primarily to a core-set curl that results from the filmstrip having been tightly wound on a film cartridge spool.

The cross-film curvature across the width of the filmstrip is primarily caused by the number of multilayers of emulsion and MOF layer (if present). The emulsion multilayers (and MOF layer, if present) have different stretch properties than that of the base film substrate of acetate, PET, or PEN material. The cross-film curvature is also influenced by the bending phenomena known as anticlastic curvature. The degree of cross-film curvature also depends on environmental conditions, including the time and temperature history of the film, the relative humidity, and the thickness of the film. Because of the cross-curvature, it is difficult to achieve good contact or compliance across the width of a wide, multi-head array. To provide a reliable read or write signal, the magnetic recording head must remain in close proximity to the magnetic coating. Any disturbances, such as variations in film curl, can vary the relationship of the recording head to the magnetic coating and decrease the reliability of the signal.

The space limitations in a portable hand held still camera, which necessarily must be as compact and light as possible to appeal to the average consumer, restrain the size and location of the magnetic recording head and the film drive system. In the cameras described in the above-referenced patents, the information is intended to be recorded in the MOF layer in the longitudinal tracks (defined by recording head spacing positions across the filmstrip) along the edge of or across the image area opposite to the exposed image frame, so that this information can be recombined with the image, even if the negatives are subsequently separated into individual image frames. Because of this requirement, the magnetic recording must take place downstream of the camera exposure gate area while the filmstrip is advanced to the next exposure. The exposure gate region in the camera where images are exposed is designed with film rails and a backing plate to confine and control the photographic filmstrip curvature to ensure that objects are optimally and uniformly focused by the camera lens across a given frame. The planarity of the film in other areas within the camera, specifically the downstream area, is not as carefully controlled. Thus, the filmstrip is susceptible to a greater degree of non-planarity associated with spooling, film cross-curvature, edge conditions, and other plastic deformations resulting from time, humidity, and temperature exposure described above.

The film motion during recording takes place in a frame stepping mode by means of a pulse of tension (i.e., jerking or jogging motion). When the pulse of tension is applied to a stationary filmstrip, the film tension conditions at the recording head/MOF layer interface are highly variable compounding the problems associated with the non-planarity and noncompliance of the filmstrip.

Of particular importance, the recording head-to-film interface must avoid scratching the MOF layer or the emulsion layers or the image quality will be degraded. As a result, extreme care must be taken in the design of the magnetic recording system to ensure that a minimum of surface damage occurs at the magnetic head interface and any load supporting member on the emulsion side of the film. The above-referenced patents related to the MOF layer on the filmstrip that show recording head structure are largely silent as to how to overcome these problems with recording in the image frame area.

As described above, a classical manner of contacting magnetic recording tape to a magnetic head is to provide an angle of wrap of the tape around the head contour while providing a backing support to pressure the tape against the head. In the case of photographic film, the inherent cross-curvature of the filmstrip and the high bending stiffness requires a high contacting force between the filmstrip and head to maintain contact with the MOF layer. Wide or non-uniform spacing separations between the recording head gap and the MOF layer result in lower recording density or a degraded signal. The act of bending the filmstrip around the head contour diminishes the cross-curvature at the bend, and makes the filmstrip in the bend region very stiff, such that cross-compliance to a magnetic recording head is difficult to accomplish without applying excessive force. This excessive force results in scratching and damage to the MOF layer by the head and/or to the emulsion layer by the backing support.

Problems to be Solved by the Invention

The invention is directed to solving the above stated problems of recording and reproducing information on MOF layers in the image frame area of a filmstrip in a camera or in other filmstrip processing, handling or other apparatus while avoiding damage to the filmstrip in the image frame area.

SUMMARY OF THE INVENTION

It is therefore a primary object of the invention to enhance the compliance of a magnetic recording head with the MOF layer of a filmstrip for recording and/or reproducing information accurately in a plurality of tracks in the image area of the MOF layer without negatively affecting the quality of the photographic image.

It is a further object of the present invention to provide a system for achieving a high degree of compliance of a multi-head array extending across the filmstrip in such a fashion that the compliance to the multi-head array is enforced via an external compliant backing means that provides localized forces from the emulsion side of the filmstrip to the extent that the effects of the cross-film curvature exhibited in the filmstrip are mitigated.

The invention is realized in a first aspect in a magnetic record/reproduce apparatus, e.g. a photographic camera, for receiving an elongated filmstrip having a cross-film curvature and having a substantially transparent magnetic layer deposited on the film surface and for recording or reproducing information on or from the magnetic layer in relation to the exposure of image frames of the filmstrip comprising: means for defining an elongated film transport path in a longitudinal direction between a filmstrip supply and a filmstrip take-up; a magnetic record/reproduce multi-head array formed of a plurality of magnetic record/reproduce head elements mounted to extend across the width of the filmstrip and across the filmstrip image frame area, each magnetic head element contacting the magnetic layer at a predetermined cross-film position in the film transport path, and each magnetic head element configured to exhibit a contoured profile in the film transport and cross-film directions for ensuring a high degree of compliance of the head elements of the elongated magnetic multi-head array with the magnetic layer of the filmstrip at each cross-film position without damaging the filmstrip magnetic layer; compliant backing means mounted with respect to the film transport path to extend across the filmstrip and bear against the filmstrip emulsion side opposite to the magnetic recording/ reproduce multi-head array and providing a loading force through the filmstrip and against the magnetic head elements to achieve compliance of the magnetic head elements with the filmstrip magnetic layer; and means for advancing the filmstrip in a longitudinal direction in the film transport path from a filmstrip supply to a filmstrip take-up with the magnetic layer contacting the elongated magnetic record/reproduce multi-head array.

Preferably, the surfaces of the head elements aligned to contact the filmstrip magnetic layer are burnished or lapped by an abrasive tape lapping of the head as a final contouring operation on the head to remove all edges that can scrape or scratch the magnetic surface of the filmstrip. In this process, the abrasive tape lapping takes place as the abrasive tape is advanced between the filmstrip supported on a compliant backing means and the array of head elements and a light pressure is applied through the backing means.

In one embodiment, the compliant backing means comprises a freewheeling, compliant roller of about 1/16"-thick red silicone rubber of 70 Shore A Durometer, optionally having a cover made of a 7-mil-thick layer of polyester (PET) nonwoven liner. Furthermore, the roller may be formed with reliefs between the head track positions.

In other embodiments, the backing means may take the form of a fixed compliant pad, or a spring loaded pad or a soft plush pad, each optionally having the liner cover and/or backing reliefs between head track positions.

In all embodiments, the magnetic record/reproduce head elements are preferably magnetic recording heads but may be magnetic recording and reproducing heads and may for convenience be referred to in either case as recording head elements or as magnetic head elements. Preferably the magnetic record/reproduce head elements are formed in an elongated multi-head array of the type disclosed in the above-referenced (Docket 69,995) application for recording and/or reproducing information from the tracks of the MOF layer in the format disclosed in the above referenced '472 patent in either analog or digital form.

The invention is preferably implemented within a camera where the filmstrip is transported through a camera exposure gate for exposing image frames in the photosensitive layers of the filmstrip on the opposite side of the filmstrip from the MOF layer. The invention may also be practiced in other filmstrip transport apparatus associated with film manufacture in order to pre-record information in certain tracks or in processing of the exposed filmstrips to develop the image frames or in making prints from the image frames in order to record further information in other tracks or for any other reason that it may prove useful to read information from or write information into selected tracks of the MOF layer.

ADVANTAGES OF THE INVENTION

In accordance with the present invention, and due to the various features thereof, a recording head-to-film interface in the film transport path that enables near-contact compliance over the width of multiple tracks, and over a large area around the individual magnetic recording head element gaps, is achieved. The head-to-film interface is operable over the broad range of film cross-curvatures that might be encountered. In addition, the invention provides a stable recording interface insensitive to the transient nature of film tension, while the film is advanced from frame to frame.

BRIEF DESCRIPTION OF THE DRAWINGS

These and other objects, advantages and features of the invention will become apparent from the detailed description given hereinafter in relation to the accompanying drawings, in which.

The figures are not necessarily to scale.

DETAILED DESCRIPTION OF THE PREFERRED EMBODIMENTS

Figure 1:
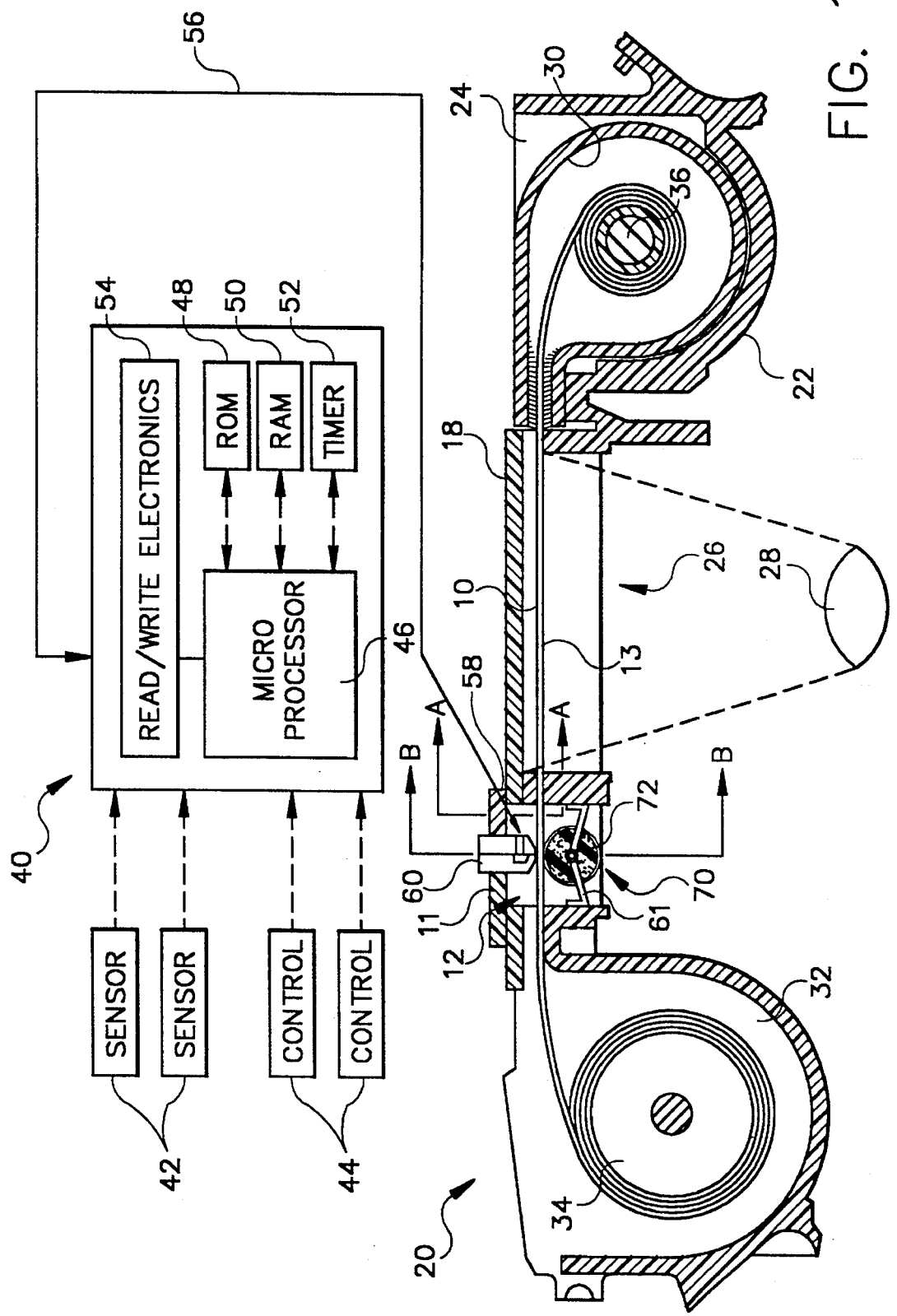
FIG. 1 is a schematic illustration of the components of a camera in which the present invention may be practiced.

The present invention preferably employs a photographic filmstrip of the type described in detail in the above-referenced '873 patent, for example, incorporated herein by reference, having the optically transparent MOF layer continuously coated on the non-emulsion side of the filmstrip base. A camera system for recording information into and reproducing information from spaced parallel tracks in the MOF layer employing such a filmstrip 10 is depicted in FIG. 1 and may take the form depicted in the above-referenced '780 or '873 patents. FIG. 1 schematically illustrates any such camera, and features not necessary for an understanding of the present invention have been omitted or shown in block diagram to simplify the disclosure.

The schematically illustrated section of camera 20 comprises a frame or housing 22 having a chamber 24 at one end thereof for receiving a film cartridge 30. The cartridge 30 as depicted takes the form of a conventional 35 mm cartridge having a passive light lock through which the filmstrip 10 is withdrawn from the cartridge spool 36 an image frame at a time for exposure and rewound after exposures are complete. The film cartridge may take the form of a "thrust" style cartridge with an active light lock, of the type disclosed in commonly assigned, U.S. Pat. No. 5,231,438, having a door through which the filmstrip 10 is advanced for exposure and rewound after all frames are exposed. In either case, as is well known in the art, the film cartridge 30 is inserted into the chamber 24 through the camera back or a film loading chamber door (not shown) so that when either is closed, the cartridge 30 is fixedly held in the orientation shown in FIG.

1. Since such camera and cartridge interface features are well known in the art, further description is deemed unnecessary.

From the cartridge 30, the filmstrip 10 is unwound from cartridge spool 36 and transported in a film transport path across a rectangular exposure gate opening 26 aligned with a camera taking lens 28, shutter and aperture etc., to a film take-up chamber 32 where it is wound on the take-up spool 34. The emulsion layer 13 of the filmstrip 10 faces the exposure gate opening 26 and camera taking lens 28. Mechanisms for accomplishing such film transport are well known in the art. Typically, the filmstrip advance/rewind mechanism (not shown) is operated to advance the filmstrip 10 an image frame at a time from the cartridge 30 to the take-up spool 34 after each image frame exposure.

All camera operations in advancing and rewinding the filmstrip, controlling the exposure of image frames, providing electronic flash illumination, and the like, are controlled by an electronic control system 40 which incorporates operating routines that respond to sensor inputs 42 and camera controls 44. The electronic control system 40 is provided with a pre-programmed microprocessor 46 coupled with ROM 48 and RAM 50 and a timer 52 and other signal processing and camera operating circuitry. Other elements of the camera 20 include a conventional metering system for monitoring advance of the filmstrip 10, a shutter release mechanism (not shown), conventional automatic focus and exposure control systems (not shown), a conventional digital frame counter, as well as display and user interface switches (not shown) among the camera controls 44. These components are also all controlled from the electronic control system 40 by microprocessor 46 in a manner well known in the art of still cameras, and since they form no part of the present invention, further description is deemed unnecessary.

Microprocessor 46 also operates the read/write electronics block 54 to record in or read information from tracks in the MOF or magnetic layer 11 of the filmstrip 10 during each advancement of the of filmstrip 10 between the cartridge 30 and take-up chamber 32. The information to be recorded is described above and may include order related information to be magnetically recorded on the filmstrip 10 from the camera user through camera controls 44, such information pertaining to the number of prints desired for a given frame, by frame number, for example, or the name and address of the camera user for ultimate use by the photofinisher, or a title of the scene or event being photographed in any of the methods described in the above-referenced, commonly assigned patents. The microprocessor 46 may also accept scene exposure related information from camera sensors 42 to be magnetically recorded on the filmstrip 10 for ultimate use by the photofinisher. Such information may include camera identification, orientation of the camera to the scene being photographed, scene luminance, aperture setting and shutter speed, and the like.

FIG. 1 also depicts a magnetic record/reproduce multi-head array or recording head 60 coupled to the read/write electronics block 54 through a signal line 56. While schematically depicted in an end view in FIG. 1, it will be understood from the following description that the magnetic recording head 60 is a linear array of discrete recording head elements $62_1$–$62_n$ formed in a manner to be described. The magnetic recording head 60 is positioned in an elongated record/reproduce gap or opening 12 in the platen or backing plate 18 just past the end of the image frame exposure gate and protrudes below the reference plane of the backing plate 18 by about 25–125 microns to make contact with the filmstrip magnetic layer 11. Before describing the details of the magnetic recording head 60 and its backing support 70 in the record/reproduce opening 12, reference is first made to FIG. 2.

Figure 2:
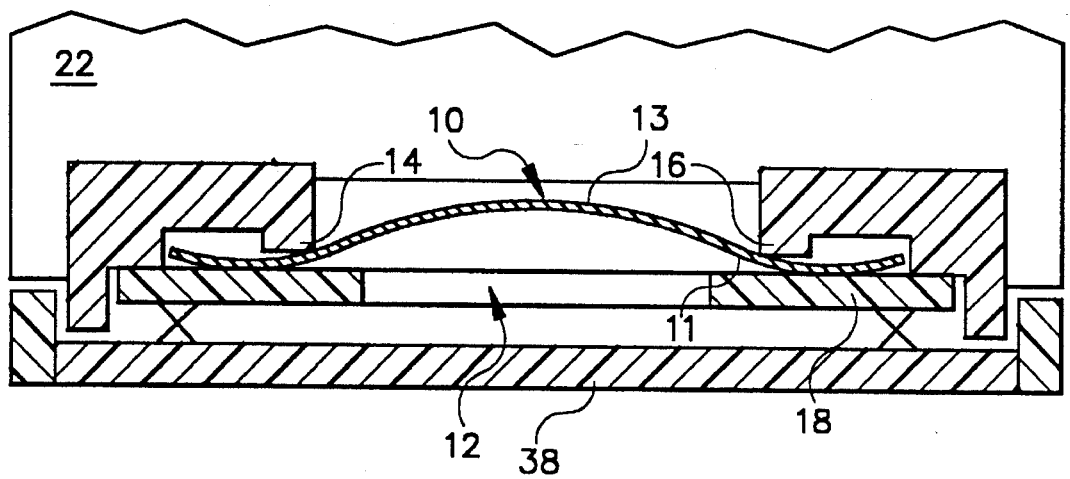
FIG. 2 is a partial cross-section view along line A—A of FIG. 1 the cross-film curvature of the filmstrip in the film transport path.

FIG. 2 is an end cross-section view of the film transport path in the exposure gate 26 depicting in exaggerated fashion, the cross-film curvature or curl across the width of filmstrip 10 and the variable spacing of the filmstrip 10 from the backing plate 18 with filmstrip advance motion. FIG. 2 also schematically shows, again in exaggerated fashion, the degree to which the filmstrip 10 must be flattened by pressure asserted against the emulsion layer 13 in accordance with the present invention to maintain the magnetic recording head elements in compliance with the filmstrip magnetic layer 11.

The concave (as viewed from the magnetic layer 11) cross-film curl depicted in FIG. 2 is present when the filmstrip 10 is constrained longitudinally along its edges between a pair of film rails 14 and 16 formed in camera housing 22, extending along opposite sides of the rectangular exposure gate opening 26, and the backing plate 18. The filmstrip 10 is urged toward the rails by backing plate 18 mounted on a leaf spring on the camera back 36. The backing plate 18 comprises a flat rectangular plate having planar dimensions complimentary with the rectangular exposure opening 26 and having the elongated record/reproduce opening 12 formed therein to accommodate the multi-head array of magnetic recording head elements $62_1$–$62_8$.

After loading the film cartridge 30 and directing the leading end of the filmstrip 10 into the take-up chamber 32, the camera back 36 or the film loading chamber 24 is closed. The spring loaded backing plate 18 urges the edges of the filmstrip 10 with slight pressure toward the rails 14, 16 as the filmstrip 10 is advanced through the film transport path. The constraining moment of force applied along the filmstrip side edges in the vicinity of the rails 14, 16 actually causes the free state convex (as viewed from the magnetic layer 11) cross-film curvature to be reversed to the concave cross-film curvature shown in FIG. 2.

More specifically, the filmstrip 10 is typically confined within a film transport gap from 150–300 μm. The backing plate 18 will tend to remove longitudinal curl resulting from film core set in the cartridge 30 and reverse the cross-film curvature across the filmstrip 10. Since the filmstrip 10 is unsupported transversely on its emulsion side, the depicted concave cross-film curl in the out-of-flatness tolerance range of 25–100 μm still exists during film exposure but not enough to noticeably degrade the image. The filmstrip 10 bows away from the backing plate 18 in the center of the camera exposure gate 26 and towards the backing plate 18 at the end of the camera exposure gate 26 by an amount dependent on the cross-curvature of the particular filmstrip.

In a typical still camera, the spacing between the backing plate 18 and the rails 14, 16 is in the range of 0.25–0.45 mm as a result of manufacturing tolerances. The photographic filmstrip 10 used in such a camera is typically 0.15 mm thick. Accordingly the filmstrip edges may not actually engage the rails 14, 16. Due to the transverse film curl, the extreme edges of the filmstrip 10 may actually engage camera frame surfaces outside the rails 14, 16 with the curl bias causing most of the width of the filmstrip 10 to engage the backing plate 18. Because of this result, the camera lens 28 is typically focused on a film plane next to the backing plate 18.

The cross-film curl described above with respect to the film exposure gate opening 26 is also evident in the record/ reproduce opening 12 as viewed at line A—A in FIG. 1 and with the magnetic head 60 and backing support 70 absent. As mentioned above, the degree of cross-film curl is greatly exaggerated in the view in the opening 12 depicted in FIG. 2. However, it will be understood that even the small cross-film curvature causes loss of compliance with the individual recording head elements $62_1$–$62_n$ if the elements are arrayed in a rigid, straight support, and the gaps or losses of compliance that occur degrade performance. The edges of the individual recording head elements $62_1$–$62_n$ can also scratch the filmstrip magnetic layer 11.

Figure 3:
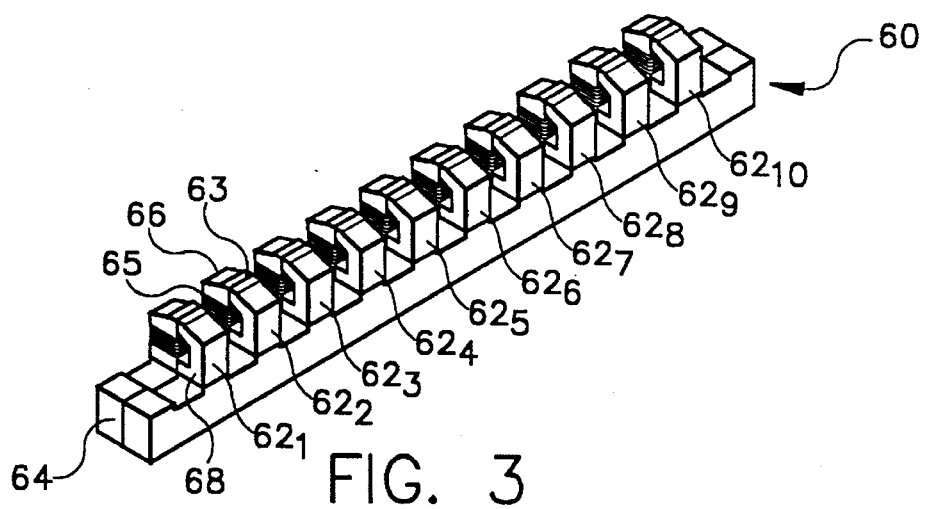
FIG. 3 is a perspective view of one embodiment of a magnetic multi-head array that may be shaped with the frustums of FIG. 4 and contoured in accordance with the invention.

Turning to FIG. 3, it depicts a magnetic head 60 formed as a linear array of n=10 ferrite head elements $62_1$–$62_{10}$ formed on a substrate 64 each separated a fixed distance apart and having a relatively uniform height profile and a face formed as a "frustum". The head elements $62_1$ and $62_{10}$ may be "dummy" heads, that exist simply to stabilize the filmstrip cross-curvature for the active magnetic recording head elements $62_2$–$62_9$. When active recording heads are used in the outermost positions, compliance problems can be experienced by the outer tracks due to the continuously varying film cross-curvature and the edge and sprocket hole curvature effect of the filmstrip 10. However, in this preferred embodiment all of the magnetic recording head elements $62_1$–$62_{10}$ are active recording and/or reproducing heads.

Each magnetic recording head element $62_1$–$62_{10}$ is formed of a straight half core element 66 and a C-shaped half core element 68 jointed together to form the head gap 63 in a frustum shape. As indicated with respect to head $62_1$, copper wire coil 65 is wrapped around the straight half core element 66 to provide a field at the gap 63 in a manner well known in the art. The substrate 64 may be attached to the head support member 58.

Alternatively, thin film, magnetoresistive read heads consisting of a ceramic substrate material on which the thin film materials demonstrating magnetoresistive (MR) behavior may be employed and contoured as described below. Such thin film MR head structures are well known in the art and are employed as read or reproduce heads.

In accordance with the present invention, it is realized that when a cross-curved filmstrip 10 is not bent in the film transport direction around a recording head, only a light loading pressure on the emulsion layer 13 is required to conform the cross-film curvature to a relatively planar shape. The key to complying the filmstrip to a magnetic head contour without causing damage to the film is to use a light contacting pressure of the contacting support 70 against the emulsion side 13 to press the magnetic layer 11 against the magnetic head 60 after the head element surfaces and gaps of the magnetic head 60 are burnished to remove all edges 67 that can scrape or scratch the magnetic layer 11. The head surfaces are preferably pre-formed as frustums 69 as shown in FIG. 4, and the burnishing of the four edges 67 is preferably accomplished by an abrasive tape lapping of frustum surfaces of the array of magnetic head elements $62_1$–$62_n$ as a final contouring operation described below.

Figure 4:
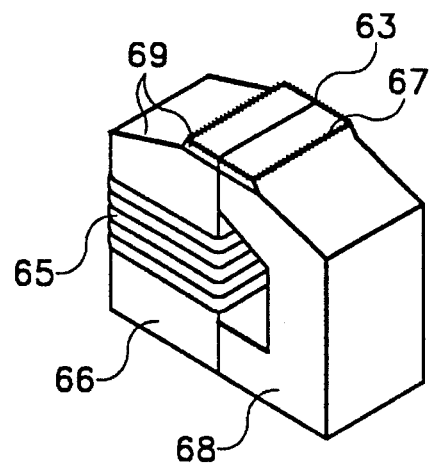
FIG. 4 is an enlarged view of a magnetic head element depicting the frustum shape formed in accordance with the invention.

A frustum 69 of each of the head elements $62_1$–$62_n$ is depicted schematically in FIG. 4 and is in the shape of a right quadrangular pyramid having a rectangular top bounded by the edges 67. The width of the top of each frustum 69 (in the track width direction) ranges from 0.30 to 1.00 mm, whereas the length ranges from 0.30 to 2.00 mm. The lateral faces of each frustum 69 are inclined to the top of the frustum 69 at the plane angle ranging from 10° to 30°, however a larger plane angle up to 90° is also contemplated if the top edges 67 are further rounded. The head gap 63 dimensions are dependent on the recording wave length. For 8,000 FCI, the head gaps 63 are from 2.0 to 5.0 microns, whereas for 16,000 FCI, the head gaps 63 can be from 1.2 to 2.1 microns.

In accordance with the invention, the frustum edges 67 in the cross-film and the film transport path directions are formed with a smooth contour extending in both directions. Preferably this is accomplished by burnishing the frustum edges 67, so that all four edges 67 are smoothed in both directions, by a lapping operation. Such a lapping operation is described in detail in the above-referenced '(Docket 69,995) application where the magnetic head 60 penetrates the film transport path plane, and the filmstrip 10 is wrapped around the magnetic head elements $62_1$–$62_n$. The filmstrip is flattened to a certain degree in the cross-film direction by the induced bend. A diamond grit tape is interposed between the filmstrip and the head and advanced through the film transport path. The diamond grit tape is employed to lap and thereby contour the magnetic head elements $62_1$–$62_n$ in the cross-film and film transport directions to increase compliance.

A similar technique is used in the present invention, wherein the magnetic recording head 60 is positioned in a camera-like apparatus, such that the head 60 penetrates the film transport path plane by about 25–125 microns. A linear backing support 70, illustrated as a backing roller 72 supported on a spring loaded suspension 61 (similar to FIG. 1), is employed to provide light pressure against the emulsion side 13 of the filmstrip 10. The lapping of the magnetic head elements $62_1$–$62_n$ with a length of 1 micron diamond grit tape is conducted after the magnetic recording head 60 and the backing support 70 are assembled as shown in a filmstrip handling apparatus which replicates the camera gate in which the invention may be implemented. The amount of lapping necessary to achieve the smooth or blended edges is relatively low compared with that employed in the above-referenced '(Docket 69,995) application, and the head element height profiles of all of the magnetic head elements $62_1$–$62_n$ across the multi-head array remains about equal to one another.

Figure 5:
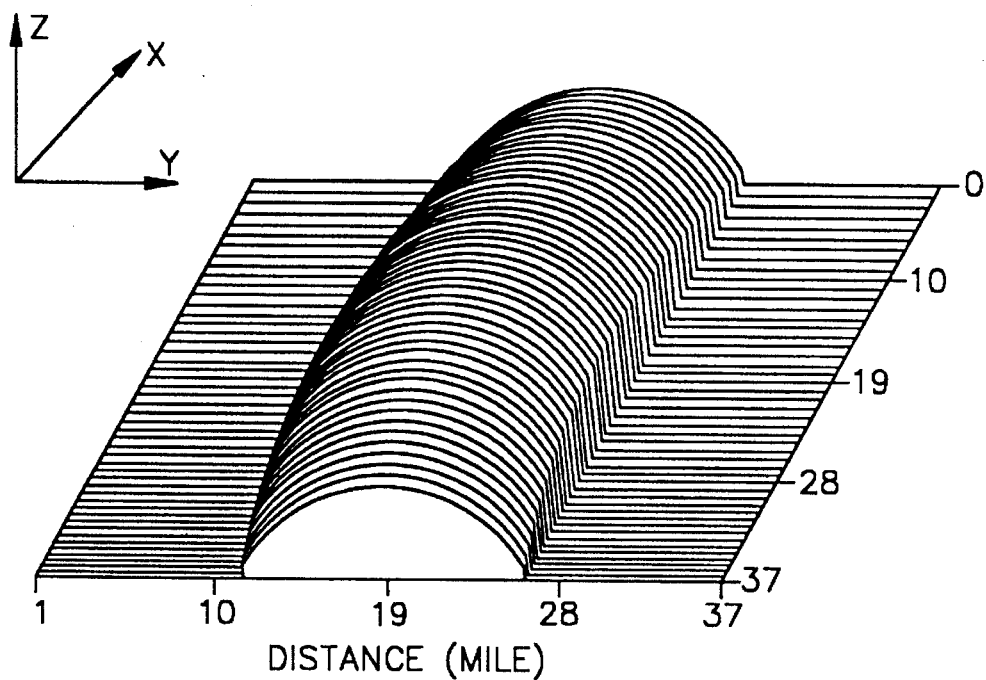
FIG. 5 is a topological drawing of the profile of a recording head element suitable for use in the present invention.

In all of the embodiments described below, it is desirable that the individual head frustums $69_1$–$69_n$ (of FIG. 4) be shaped with prolate ellipsoid surfaces that contact the MOF layer so that there are no sharp edges in the cross-film, roll change, X-direction or longitudinal, pitch change, Y-direction. These edges 65 of each recording head element may be blended into the sides of the recording heads by lapping or polishing as described above. The resulting head profile is bi-directionally crowned in a manner shown in the computer drawn topological illustration of a lapped recording head element of FIG. 5. This shaping provides a sliding surface against the filmstrip magnetic layer 11 in the spaced apart positions of the individual head elements $62_1$–$62_8$.

The radii of curvature of the sliding surface may be determined by the ratio $1.7<R_x/R_y<16.0$ where $R_x$ and $R_y$ are the radii of curvature in the X-direction and Y-direction, respectively. The width of each recording head 62 in the X-direction is from 0.30–1.00 mm, and the length of each recording head element 62 in the Y-direction is from 0.30–2.00 mm. The edges of the sliding surface of each recording head element 62 is blended by lapping or polishing to a minimum radius of 0.25 mm.

In a preferred embodiment, the side angles of the frustums are 20° to the contour of the magnetic head element, and the head frustums are slightly abraded with one micron grit diamond tape to lightly round off the edges of the frustums.

The outer radius of the contoured frustums is 1" in the direction of travel of the filmstrip 10.

To simplify manufacture, the lapping may be conducted in a component subassembly operation where the magnetic recording head 60 and the backing support 70 are assembled in a separate module and then lapped. After the lapping operation, the module may be inserted into the camera 20 in the position depicted in FIG. 1 or into other filmstrip handling apparatus.

Alternatively, the contouring of the head frustums $69_1$–$69_n$ in accordance with the invention is obtained by lapping-in the head frustums on a fixture corresponding to the actual camera frame and film transport path through the opening 12. A magnetic recording head 60 to be lapped-in is mounted into the fixture at the same position of its intended use in the actual camera (or other apparatus). In a first lapping method, a photographic filmstrip and an abrasive tape are passed together through the film transport path of the camera frame emulating fixture. The abrasive tape is mated with the filmstrip so that the abrasive film faces the head frustums $69_1$–$69_n$ to be lapped, and the photographic film bears against the emulsion side compliant backing means. In this manner, the contour of the multi-head array is lapped to match the cross-curvature of the filmstrip. The magnetic head 60 is lapped until the initially high pressure points of contact are abraded down and all of the active frustums are carrying an equivalent pressure.

An alternate method of lapping-in the contours of the above described multi-head systems is to replace the interposed lapping film and photographic film with a single abrasive film having a base substrate with similar bending stiffness to that of the intended photographic film. This would eliminate the need of using the photographic filmstrip to achieve the desired contour. Another method that would also eliminate use of the photographic film, would be to use standard-backed lapping film, but use the tension applied to the lapping film as a means influencing the final contour shape.

It has been observed that the heads lapped-in on a particular type of filmstrip base or exhibiting a certain degree of cross curvature can be used with satisfactory compliance with filmstrips of the same or different type exhibiting a greater or lesser degree of cross curvature. In other words, the head arrays produced to exhibit the characteristics described above, when mounted to penetrate the film plane of a filmstrip restrained at the filmstrip edges in the manner described above, provide robust compliance performance without damaging the filmstrip surface for a wide variety of filmstrips.

The material and construction of the emulsion side compliant backing means or support is critical to providing a uniform pressure against the filmstrip emulsion layer and complying the filmstrip locally to the contoured head elements bearing against the magnetic layer 11. The backing support material should be non-abrasive and non-tacky to allow smooth frictionless contact at the support/emulsion interface.

Figure 6:
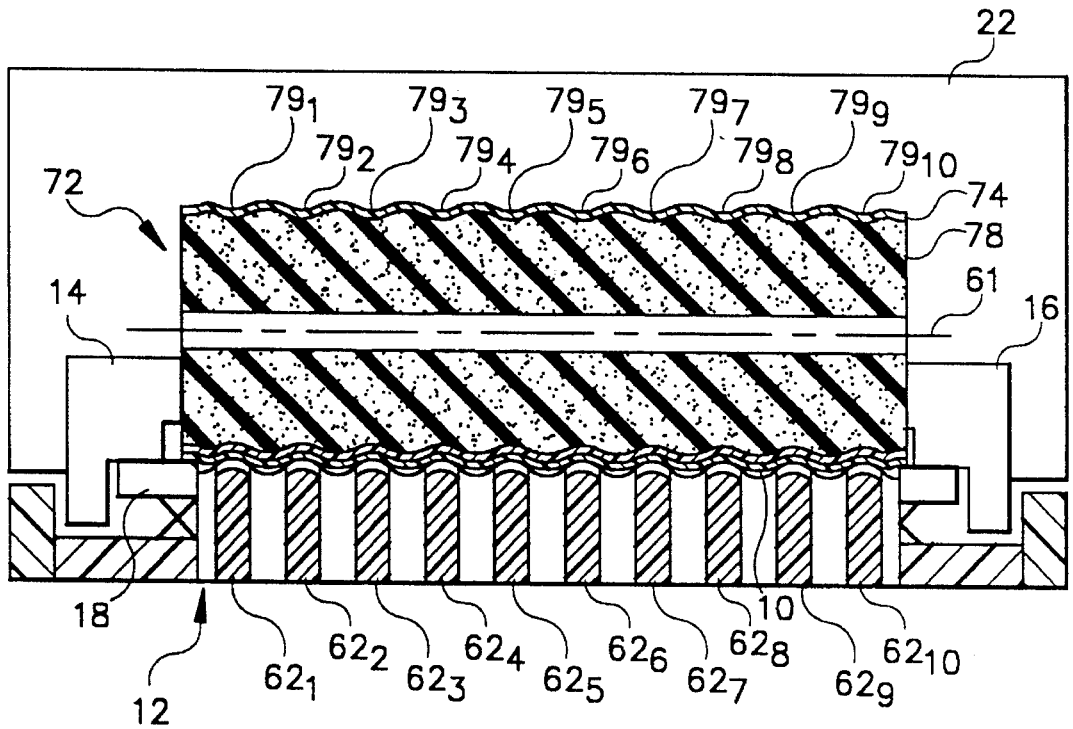
FIG. 6 is a partial cross-section view along line B—B of FIG. 1 of the filmstrip between the magnetic recording head and backing support in the film transport path.

FIG. 6 is a further cross-section view of the assembly of the magnetic head 60 and backing support 70 in the opening 12 illustrating the application of the flattening force to the array of magnetic head elements $62_1$–$62_n$ after the head elements are lapped-in as described above using an emulsion layer support roller 70 as the emulsion side support means. The filmstrip 10 is shown with exaggerated deformation around the contoured head elements $62_1$–$62_n$ in the cross-film direction effected by force applied by the support roller 70.

In one embodiment, it has been found that a combination of a nonwoven polyester sheet material backed by a silicone rubber, spring loaded pad or roller of 70 Shore A durometer gives satisfactory results when contacting the emulsion side 13 and forcing the filmstrip 10 against the contoured magnetic head elements $62_1$–$62_n$.

Figure 7:
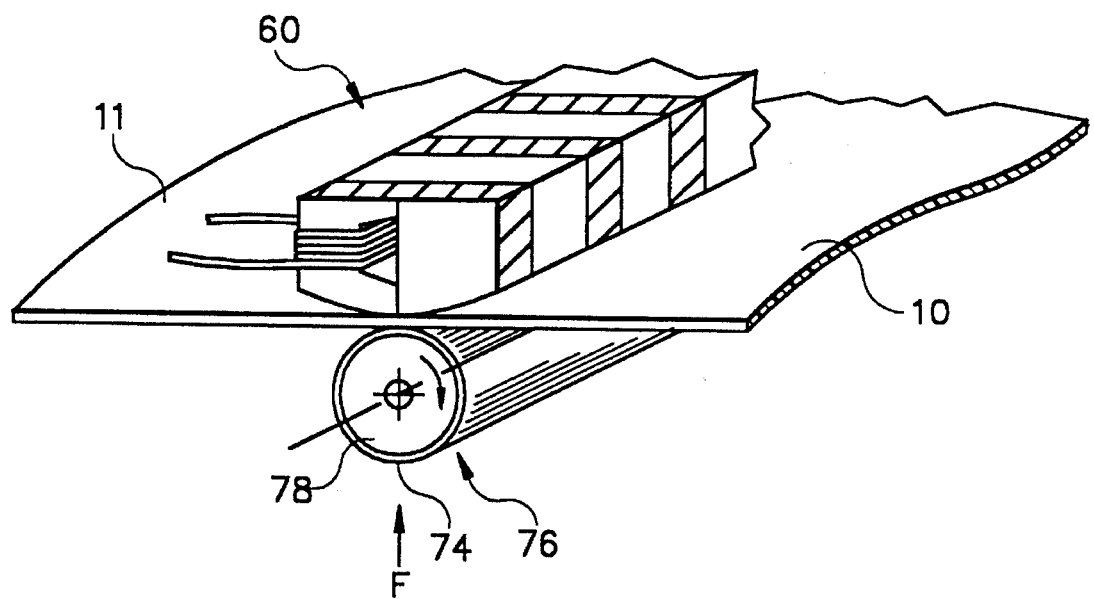
FIG. 7 a schematic illustration of the orientation of the magnetic recording head elements with respect to a backing roller in accordance with one embodiment of the invention.

FIGS. 6 and 7 depict a backing support roller 72 constructed of a 7-mil-thick layer of a PET nonwoven liner material in cover layer 74 over a ⅟₁₆" thick red silicone rubber roller 78 of about 70 Shore A Durometer. The roller 78 may be formed with a plurality of reliefs $79_1$–$79_n$ that approximately match the head element contours in the cross-film direction and are spaced along the length of the backing support roller 72 to conform to the head track positions to achieve even higher compliance with the contoured magnetic recording head elements $62_1$–$62_n$.

Figure 8:
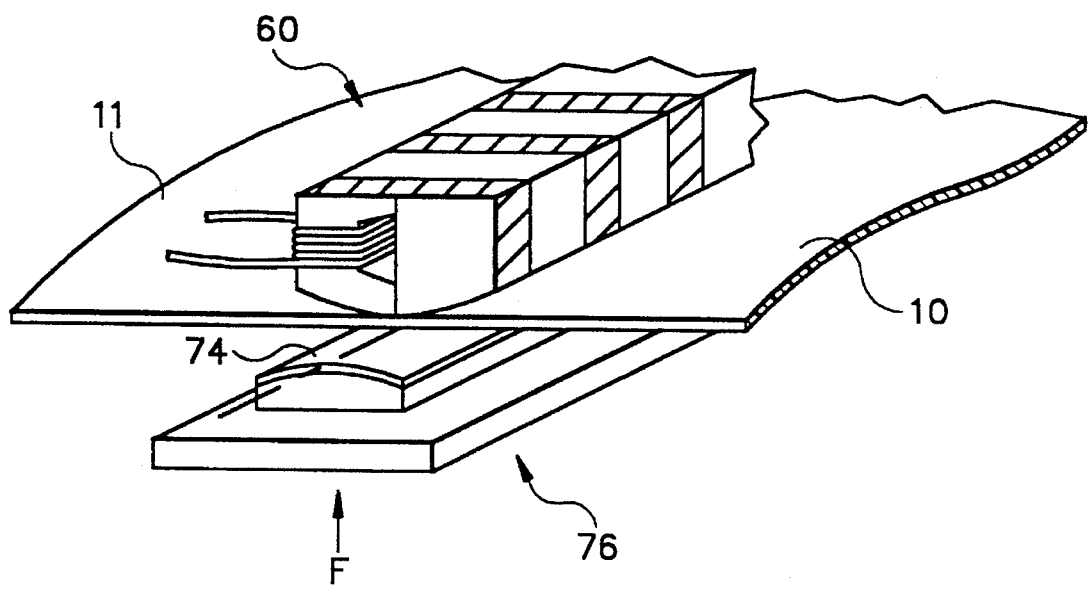
FIG. 8 is a schematic illustration of the orientation of the magnetic recording head elements with respect to a backing pad in accordance with a further embodiment of the invention.

FIG. 8 depicts these materials formed as a backing support pad 76, consisting of a 7-mil-thick PET nonwoven liner layer 74 on top of a ⅟₁₆"-thick pad layer 80 of red silicone rubber of about 70 Shore A Durometer. The support pad 76 is spring loaded against the filmstrip emulsion side 13 to conform the filmstrip magnetic layer 11 to the head elements of magnetic recording head 60. The support pad 76 may also be formed with reliefs between the head element positions to achieve even higher compliance with the contoured magnetic recording head elements.

Figure 9:
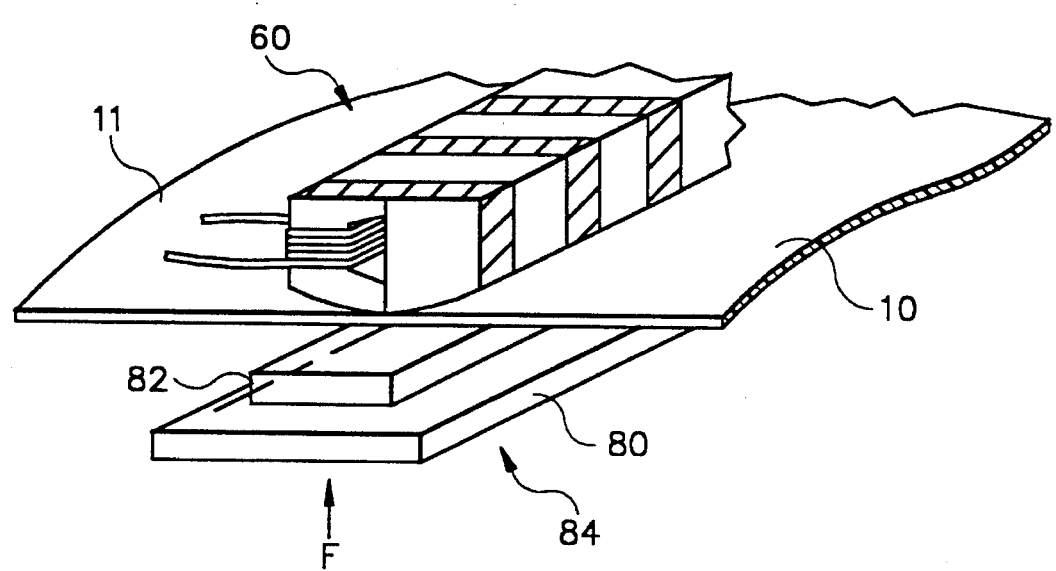
FIG. 9 is a schematic illustration of the orientation of the magnetic recording head elements with respect to a backing brush in accordance with a further embodiment of the invention.

Other materials having low friction, high conformance characteristics similar to the PET layer, such as plush fiber pad 82, commonly used in a film cartridge, or a fine brush material, are also satisfactory. Such a brush support pad 84 is shown in FIG. 9 with the plush fiber pad 82 extending into contact with the emulsion layer of the filmstrip 10. To compensate for the variation in filmstrip cross-curvature in the range of temperature and humidity typically experienced, a spring load may be provided in the range of 80–200 grams. The plush fiber pad 82 is preferably a soft brush of PET fibers of a diameter of about 5 microns and a length of about 3–8 microns in a density of about 10,000 fibers / mm².

Figure 10:
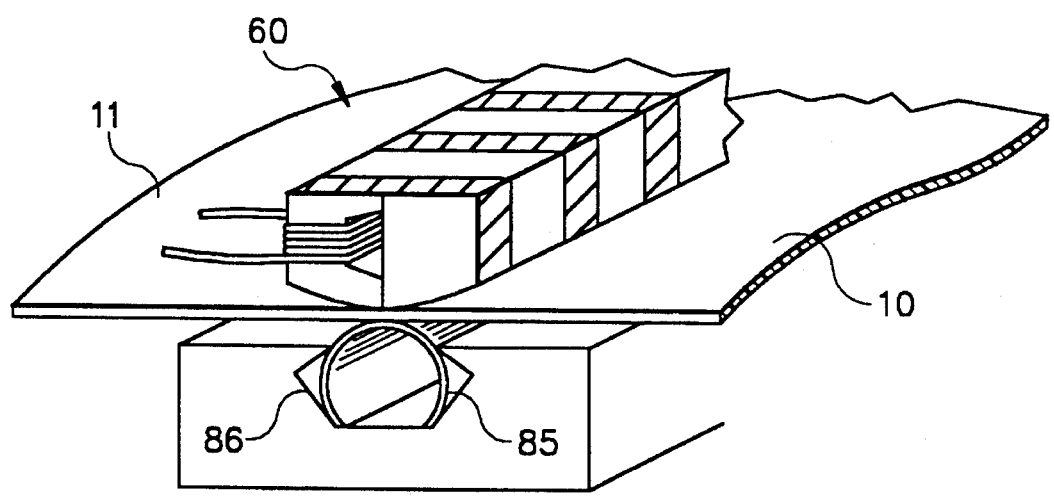
FIG. 10 is a schematic illustration of the orientation of the magnetic recording head elements with respect to a backing bubble spring in accordance with a further embodiment of the invention.

FIG. 10 depicts a further emulsion side backing support means that may alternatively be employed in the present invention as a bubble spring 85 of the type described in the above-referenced, commonly assigned '522 patent. In the '522 patent, a bubble spring is employed with a magnetic record/reproduce head for recording or reproducing in magnetic tracks adjacent the filmstrip edges outside the filmstrip image area. In FIG. 10, the bubble spring 85 extends all the way across the multi-head array 60 in the bubble spring cavity 86. The bubble spring 85 may be a continuous single piece or may be separated in the spacings between the discrete recording head elements $62_1$–$62_n$ to individually apply pressure against each head element through the filmstrip 10. The bubble spring 85 has a spring shape when it is confined in the cavity 86 shaped as shown in FIG. 10. The multi-head array 60 is penetrated into the filmstrip 10 sufficiently to compress the bubble spring 85 from its free shape with a load in the range of about 80–200 grams, enhancing compliance of the contoured head elements with the filmstrip magnetic layer across the filmstrip image area.

The bubble spring 85 may be formed of a flat strip or sheet of cold rolled, full hard, Type 302 stainless steel of about 25–75 microns thickness. Other elastically deformable, low friction sheet materials that can be formed into a bubble spring may also be employed. To reduce friction further, the emulsion layer contacting surface may be treated or coated with a low friction material to minimize the potential for damaging the filmstrip.

What has been described is an image area magnetic head-to-film interface, the contouring of, and the methods and apparatus for contouring a magnetic multi-head array whose compliance to the photographic filmstrip is enforced via an external compliant backing means that provides localized forces from the emulsion side of the filmstrip to the extent that the effects of the cross-film curvature exhibited in the filmstrip are mitigated. The methods and apparatus disclosed can be used with photographic filmstrip in drives, cameras, readers, and/or scanners. In addition, the methods and apparatus disclosed may be used to contour combination read/write heads with more than one parallel gap. These techniques produce a head contour that has good compliance to the MOF surface with a uniform pressure distribution and an absence of high pressure regions (such as sharp corners and edges) that could cause film damage.

While there has been shown what are considered to be the preferred embodiments of the invention, it will be manifest that many changes and modifications may be made therein without departing from the essential spirit of the invention. It is intended, therefore, in the following claims to cover all such changes and modifications as may fall within the true scope of the invention.

PARTS LIST FOR FIGS. 1–10 filmstrip 10
filmstrip magnetic layer 11
elongated record/reproduce gap or opening 12
filmstrip emulsion layer 13
filmstrip rails 14, 16
camera backing plate 18
camera 20
camera frame or housing 22
chamber 24
exposure gate opening 26
camera taking lens 28
film cartridge 30
take-up chamber 32
take-up spool 34
film cartridge spool 36
camera back 38
electronic control system 40
sensor inputs 42
camera controls 44
pre-programmed microprocessor 46
ROM 48
RAM 50
timer 52
read/write electronics block 54
signal line 56
head support member 58
magnetic record/reproduce multi-head array or recording head 60
spring loaded suspension 61
array of discrete recording head elements $62_1$–$62_n$
head gap 63
head array substrate 64
coil winding 65
straight half core element 66
frustum edges 65
C-shaped half core element 68
frustums $69_1$–$69_n$
linear backing support 70
linear free wheeling roller 72
cover layer 74
backing support layer 76
rubber roller 78
reliefs $79_1$–$79_n$
silicon rubber pad layer 80
plush fiber pad 82
bubble spring 85
bubble spring cavity 86

What is claimed is:

1. A magnetic record/reproduce system for recording and/or reproducing information in relation to emulsion layer side image frames of a photographic filmstrip in a substantially transparent magnetic layer on a further side of said photographic filmstrip, said filmstrip having a curvature in the cross-film direction extending across the width of said filmstrip, said system comprising:

means for defining an elongated film transport path in a longitudinal direction between a filmstrip supply and a filmstrip take-up;

an elongated magnetic record/reproduce multi-head array formed of a plurality of record/reproduce head elements mounted to extend across the width of said filmstrip and across the filmstrip image frame area, each head element contacting said magnetic layer at a predetermined cross-film position in said film transport path, and each head element configured with a contoured profile in the film transport and cross-film directions for ensuring a high degree of compliance of the magnetic recording head with the magnetic layer of the filmstrip at each cross-film position without damaging the filmstrip magnetic layer;

elongated compliant backing support means mounted with respect to said film transport path to extend across the filmstrip and bear against the filmstrip emulsion layer side opposite to said magnetic multi-head array and providing a loading force through the filmstrip and against said magnetic head elements to flatten the cross-film curvature to achieve compliance of said magnetic head elements with said filmstrip magnetic layer; and means for advancing said filmstrip in a longitudinal direction in said film transport path from a filmstrip supply to a filmstrip take-up with said magnetic layer contacting said magnetic multi-head array.

2. The system of claim 1 wherein each of said magnetic head elements are formed in the shape of a frustum having rectangular faces bounded at the face edges by sloped sides in the cross-film direction and the film transport direction, and wherein said face edges are smoothed into said sloped sides to effect said contoured profile.

3. The system of claim 2 wherein said face edges are smoothed into said sloped sides to effect said contoured profile by lapping with an abrasive tape passed between said head array and said backing support means.

4. The system of claim 2 wherein said face edges are smoothed into said sloped sides to effect said contoured profile by machining said frustums edges.

5. The system of claim 1 wherein said backing support means is a freewheeling, compliant roller of red silicone rubber of 70 Shore A Durometer covered by a roller surface layer of smooth, non-tacky material; and further comprising:

pressure exerting means for mounting said roller for freewheeling rotation with respect to said filmstrip transport path in alignment with said magnetic head array to exert a pressure of about 80–200 grams against said filmstrip emulsion layer and through said filmstrip and against said aligned magnetic head array.

6. The system of claim 5 wherein said compliant roller and said roller surface layer are configured with a plurality of contoured reliefs extending around the periphery of said roller and spaced along the length thereof in said cross-film direction corresponding to the spacing of said head elements in said head array.

7. The system of claim 1, wherein said backing support means is a plush pad of soft fibers extending toward said filmstrip emulsion layer; and further comprising:

pressure exerting means for mounting said pad with respect to said filmstrip transport path in alignment with said magnetic head array to exert a pressure of about 80–200 grams against said filmstrip emulsion layer and through said filmstrip and against said aligned magnetic head array.

8. The system of claim 7 wherein said plush pad is a soft brush of PET fibers of a diameter of about 5 microns and a length of about 3–8 mm in a density of about 10,000 fibers/mm$^2$.

9. The system of claim 1 wherein said backing support means is an elongated compliant pad of red silicone rubber of 70 Shore A Durometer covered by a surface layer of smooth, non-tacky material; and further comprising:

pressure exerting means for mounting said pad with respect to said filmstrip transport path in alignment with said magnetic head array to exert a pressure of about 80–200 grams against said filmstrip emulsion layer and through said filmstrip and against said aligned magnetic head array.

10. The system of claim 9, wherein said backing support means comprises said surface layer of non-woven polyester about 0.007 inches thick over a 1/16"-thick layer of red silicone rubber of about 70 Shore A Durometer.

11. The system of claim 1 wherein said backing support means is an elongated bubble spring formed of a sheet of low friction elastic material confined in an elongated bubble spring cavity to present a surface in contact with said emulsion layer side; and further comprising:

means for mounting said elongated magnetic record/reproduce multi-head array with respect to said filmstrip transport path in alignment with said elongated bubble spring to deform said elongated bubble spring and thereby exert a pressure of about 80–200 grams against said filmstrip emulsion layer and through said filmstrip and against said aligned magnetic head array.

12. In a photographic camera, a magnetic record/reproduce system for recording and/or reproducing information in relation to emulsion layer side image frames of a photographic filmstrip in a substantially transparent magnetic layer on a side of said photographic filmstrip, said filmstrip having a curvature in the cross-film direction extending across the width of said filmstrip, said system comprising:

a camera housing and camera frame having a filmstrip supply side and a filmstrip take-up side for accommodating said filmstrip;

an elongated record/reproduce cavity extending across said filmstrip transport path;

a pair of elongated film rails extending in parallel between said filmstrip supply side and said elongated record/reproduce cavity separated apart from one another to contact said filmstrip on one side thereof adjacent to said filmstrip edges;

a backing plate supported by said camera housing in spaced relation to said elongated film rails for forming said film transport path by restraining and flattening said filmstrip edges against said rails and extending across said cavity;

an elongated magnetic record/reproduce multi-head array formed of a plurality of record/reproduce head elements mounted to extend across the width of said filmstrip and across the filmstrip image frame area, each head element contacting said magnetic layer at a predetermined cross-film position in said film transport path, and each head element configured with a contoured profile in the film transport and cross-film directions for ensuring a high degree of compliance of the magnetic recording head with the magnetic layer of the filmstrip at each cross-film position without damaging the filmstrip magnetic layer;

means for supporting said elongated magnetic multi-head array to extend in said cross-film direction into said record/reproduce cavity position for penetrating into said cavity a distance to allow contact of said magnetic head elements with said filmstrip magnetic layer in said image frame area;

elongated compliant backing support having a compliant layer and a low friction surface;

means for mounting said compliant backing support with respect to said film transport path to extend across the filmstrip and bear against the filmstrip emulsion side opposite to said magnetic multi-head array;

means for applying a loading force through said compliant backing support and said filmstrip and against said magnetic head elements to flatten said filmstrip cross-film curvature and achieve compliance of said magnetic head elements with said filmstrip magnetic layer; and means for advancing said filmstrip in a longitudinal direction in said film transport path from a filmstrip supply to a filmstrip take-up with said magnetic layer contacting said magnetic multi-head array.

13. The camera of claim 12 wherein each of said magnetic head elements are formed in the shape of a frustum having rectangular faces bounded at the face edges by sloped sides in the cross-film direction and the film transport direction, and wherein said face edges are smoothed into said sloped sides to effect said contoured profile.

14. The camera of claim 13 wherein said face edges are smoothed into said sloped sides to effect said contoured profile by lapping with an abrasive tape passed between said head array and said backing support means.

15. The camera of claim 13 wherein said face edges are smoothed into said sloped sides to effect said contoured profile by machining said frustums edges.

16. The camera of claim 12 wherein said backing support means is a freewheeling, compliant roller of red silicone rubber of 70 Shore A Durometer covered by a roller surface layer of smooth, non-tacky material; and further comprising:

pressure exerting means for mounting said roller for freewheeling rotation with respect to said filmstrip transport path in alignment with said magnetic head array to exert a pressure of about 80–200 grams against said filmstrip emulsion layer and through said filmstrip and against said aligned magnetic head array.

17. The camera of claim 16 wherein said compliant roller and said roller surface layer are configured with a plurality of contoured reliefs extending around the periphery of said roller and spaced along the length thereof in said cross-film direction corresponding to the spacing of said head elements in said head array.

18. The camera of claim 12, wherein said backing support means is a plush pad of soft fibers extending toward said filmstrip emulsion layer; and further comprising:

pressure exerting means for mounting said pad with respect to said filmstrip transport path in alignment with said magnetic head array to exert a pressure of about 80–200 grams against said filmstrip emulsion layer and through said filmstrip and against said aligned magnetic head array.

19. The camera of claim 18 wherein said plush pad a soft brush of PET fibers of a diameter of about 5 microns and a length of about 3–8 mm in a density of about 10,000 fibers/mm$^2$.

20. The camera of claim 12 wherein said backing support means is an elongated compliant pad of red silicone rubber of 70 Shore A Durometer covered by a surface layer of smooth, non-tacky material; and further comprising:

pressure exerting means for mounting said pad with respect to said filmstrip transport path in alignment with said magnetic head array to exert a pressure of about 80–200 grams against said filmstrip emulsion layer and through said filmstrip and against said aligned magnetic head array.

21. The camera of claim 20, wherein said backing support means comprises said surface layer of non-woven polyester about 0.007 inches thick over a $\frac{1}{16}$"-thick layer of red silicone rubber of about 70 Shore A Durometer.

22. The camera of claim 11 wherein said backing support means is an elongated bubble spring formed of a sheet of low friction elastic material confined in an elongated bubble spring cavity to present a surface in contact with said emulsion layer side; and further comprising:

means for mounting said elongated magnetic record/reproduce multi-head array with respect to said filmstrip transport path in alignment with said elongated bubble spring to deform said elongated bubble spring and thereby exert a pressure of about 80–200 grams against said filmstrip emulsion layer and through said filmstrip and against said aligned magnetic head array.

* * * * *